United States Patent [19]

Ioka

[11] Patent Number: 4,819,550
[45] Date of Patent: Apr. 11, 1989

[54] AIR INTAKE STRUCTURE OF AN AUTOMOBILE

[75] Inventor: Tadashi Ioka, Hiroshima, Japan

[73] Assignee: Mazda Motor Corporation, Hiroshima, Japan

[21] Appl. No.: 224,351

[22] Filed: Jul. 26, 1988

[30] Foreign Application Priority Data

Jul. 28, 1987 [JP] Japan ................................ 62-186616
Aug. 10, 1987 [JP] Japan ................................ 62-200467

[51] Int. Cl.⁴ .............................................. B60H 1/28
[52] U.S. Cl. ....................................... 98/2.17; 98/2.16
[58] Field of Search ...................... 98/2.07, 2.11, 2.16, 98/2.17

[56] References Cited

U.S. PATENT DOCUMENTS

| 2,510,790 | 6/1950 | Arnold | 98/2.07 |
| 2,975,696 | 3/1961 | Jewell | 98/2.17 |
| 4,332,187 | 6/1982 | Imai et al. | 98/2.17 |

FOREIGN PATENT DOCUMENTS 124517 7/1985 Japan ................................... 98/2.16

Primary Examiner—Harold Joyce
Attorney, Agent, or Firm—Wegner & Bretschneider

[57] ABSTRACT

Between the bottom end of the front glass window and the top end of the dash panel constituting the front wall of the vehicle chamber is formed the cowl frame member extending in a transverse direction of the vehicle body. An air passage consists a first air passage section and a second air passage section and communicates the first air opening for introducing the open air with the second air opening for introducing the open air introduced from the first air opening into the vehicle chamber. The first air passage section is formed in a space within the cowl frame member while the second air passage section is formed outside the cowl frame member. Either one of the first and second air openings is formed in the cowl frame member in such a manner as being communicated with the first air passage section. The one of the first and second air openings and the first air passage section are positioned at an end portion of the cowl frame member in a transverse direction of the vehicle body.

18 Claims, 9 Drawing Sheets

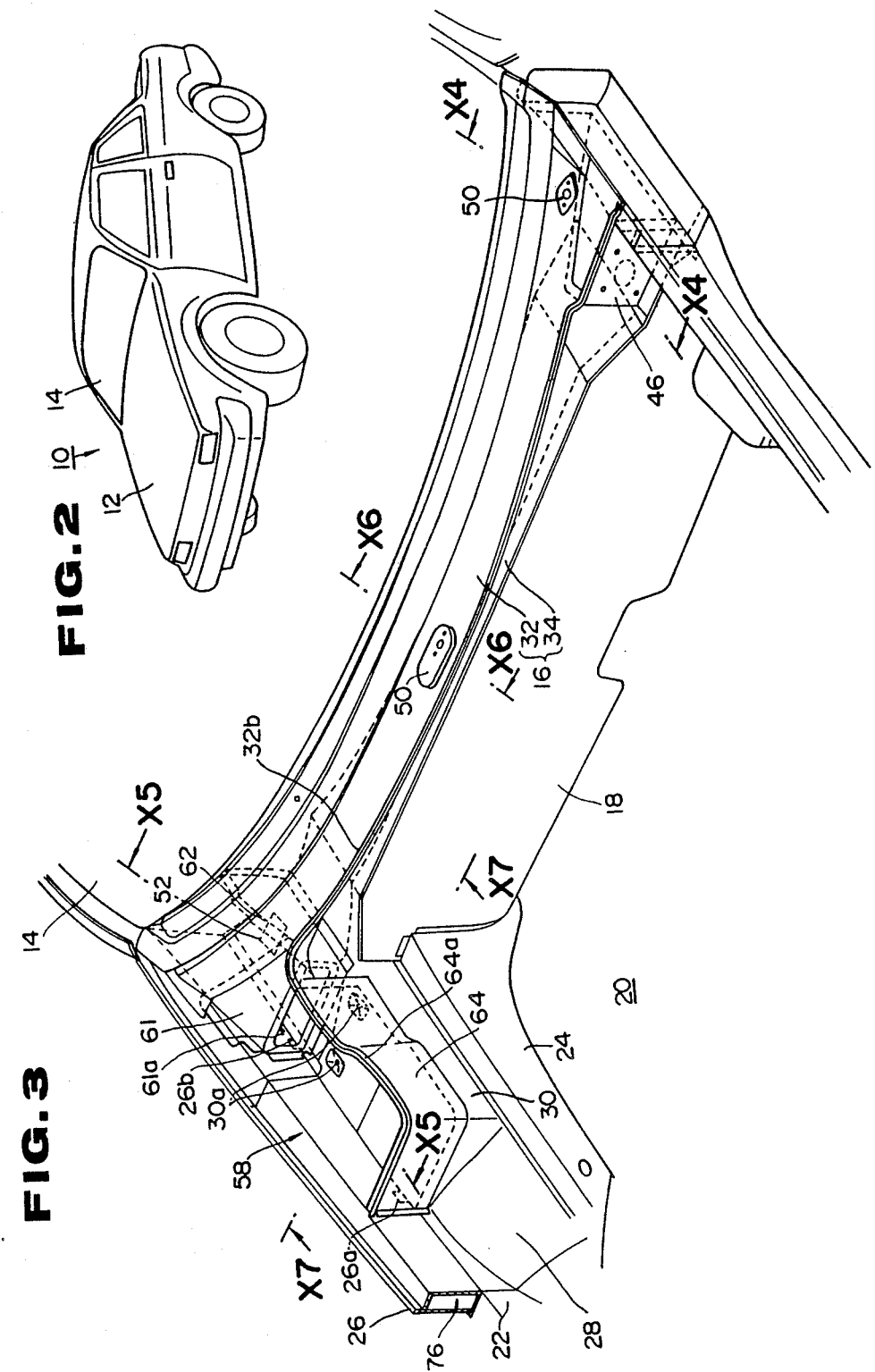

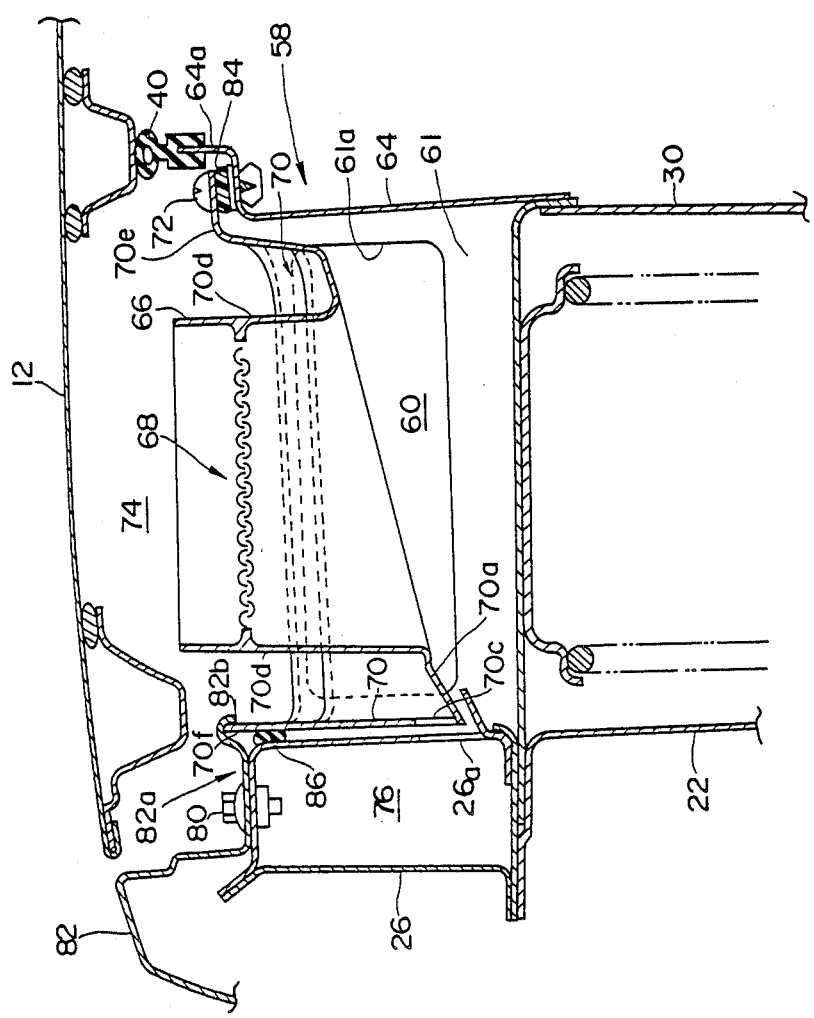

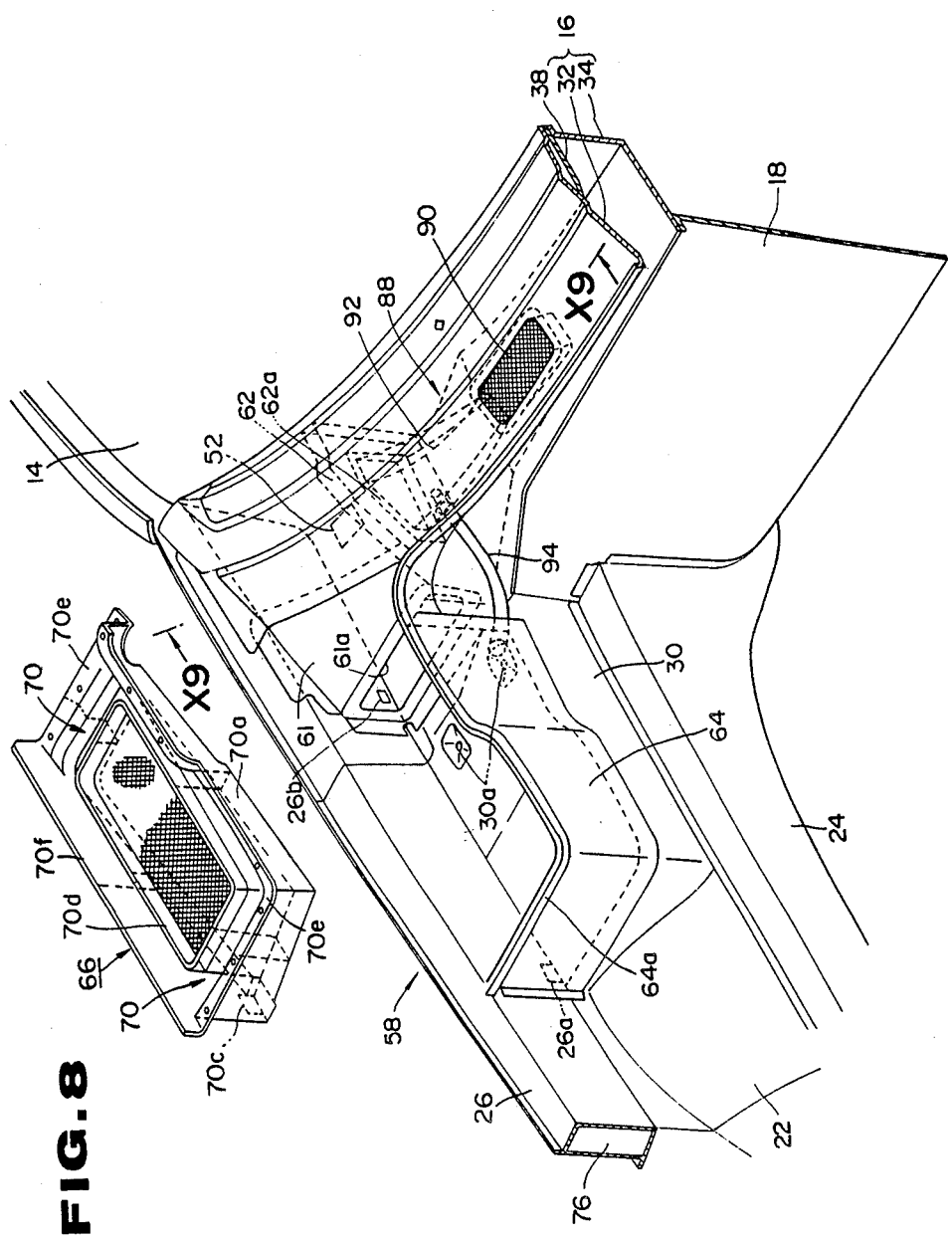

AIR INTAKE STRUCTURE OF AN AUTOMOBILE

BACKGROUND OF THE INVENTION

1. Field of the Invention

This invention relates to improvements in an air intake structure of an automobile.

2. Description of Related Art

A vehicle body structure of the automobile contains a cowl frame structure extending in a transverse direction of the vehicle body as one of vehicle body strengthening members.

The cowl frame structure consists of an upper member portion and a lower member portion, and positioned between a dash panel constituting a forward wall member of the vehicle chamber and front glass window. The upper member portion of the cowl frame supports the bottom portion of the front glass window, and the lower member portion thereof connects the upper member portion to the upper portion of the dash panel. The cowl frame structure generally functions as an air intake structure that introduces outside air into the vehicle chamber.

Japanese Utility Model Publication (laid-open) No. 82,881/1986 discloses a cowl frame structure having a closed cross section such that one of air inlets for introducing outside air into the vehicle chamber is provided on the upper member portion of the cowl frame structure while the other is disposed on the lower member portion thereof. The air inlets are communicated with each other through an air passage disposed in an interior space of the cowl frame structure.

There is another type of a cowl frame structure having such a cross section having an opening in a forward direction. This cowl frame structure is provided with one air inlet disposed on the upper member portion of the cowl frame structure and the other air inlet on the lower member portion thereof in such a manner that the two air inlets are connected to each other through a duct disposed in a space interposed between the upper and lower member portions thereof.

There is the recent tendency that they have a preference for designs of the vehicle body which consider air characteristics. A known representative method of decreasing a resistance of air flowing from the front side of the vehicle body is to decrease a forward surface area of projection by sharpening an inclined angle of the front glass window W with the bonnet B as a front hood, as shown in FIG. 13.

However, such designs on the vehicle body may cause the problem that, as an inclined angle of the front glass window W intersected with the bonnet B gets sharper, a cowl point P intersecting the window glass W with the cowl frame structure becomes lower. As a result, the difficulties may arise in ensuring spaces for location of an air conditioning unit and for placement of the legs of the operator and passenger. Referring further to FIG. 13, a space interposed between the cowl point P and a floor surface F of the vehicle chamber is used for mounting air passage A and the air conditioning unit U, and as a legs placing space S. For the air passage A, it is necessary to ensure a predetermined crosssectional area in order to provide a sufficient amount of outside air into the vehicle chamber R. Accordingly, the lower the position of the cowl point P, the more difficult it is to ensure a sufficient height in the space for mounting the air conditioning unit U and the legs placing space S. In order to avoid such difficulties, it is possible to permit a thinner structure of the air passage A disposed in the cowl frame structure while making its transverse size wider to compensate for a space reduced by lowering the cowl point P, thus ensuring a necessary space for mounting the air conditioning unit U and placing the legs of the driver and passenger. This structure of the air passages A, however, provides the drawbacks that the cowl frame structure protrudes into the vehicle chamber R or into the engine room A, thereby producing big limit to a layout of instrument panels or the engine room E.

Conventional air intake structures have one of the air inlets on the forward portion of the cowl frame structure so that it is advantageous to allow the air to be introduced during driving. However, since this arrangement may undergo a direct influence from kinetic pressures during the driving, it may permit rainfall to be introduced together with the air into the air passage, thus enabling the rainfall to be penetrated into the air conditioning unit through the other air inlet for introducing outside air into the vehicle chamber.

In order to prevent a leakage of rainfall into the vehicle chamber, the current meassure adopted by conventional air intake structure is merely that the air passage to be formed in the cowl frame structure is rendered as long as possible.

The demands that the air passage should be rendered longer in the cowl frame structure and a sufficient amount of outside air should be introduced into the vehicle chamber lead to the consequence that the cowl frame structure should be larger in cross sectional area over a considerable length where a sufficient space is required for ensuring the mounting of the air conditioning unit and the placement of the legs of the driver and passenger.

SUMMARY OF THE INVENTION

Therefore, the present invention has the object to provide an air intake structure of an automobile enabling a sufficient amount of outside air to be introduced into the vehicle chamber while preventing penetration of rainfall thereinto without sacrificing a space around the cowl frame structure even if the cowl point is rendered lower.

In order to accomplish the object, in one aspect the present invention consists of an air intake structure of an automobile, which comprises:

a dash panel constituting a forward wall member of a vehicle chamber, said dash panel being disposed underneath a front glass window;

a cowl frame member extending in a transverse direction of a vehicle body, said cowl frame member comprising an upper member portion supporting a bottom portion of said front glass window and a lower member portion connecting said upper member portion to an upper portion of said dash panel;

an air passage communicating a first air opening with a second air opening, said first air opening capable of introducing open air into the air passage and said second air opening capable of introducing the air introduced from said air passage into the vehicle chamber;

one of said first and second air openings having an opening facing the inside of said cowl frame member at a transversely opposite end portion of the vehicle body, the other air opening positioned at the outside of said cowl frame member; and said air passage comprising a first air passage section and a second air passage section, said first passage section being formed in the space within said cowl frame member at the transversely opposite end portion thereof and being communicated with said one air opening, and said second air passage section formed outside said cowl frame member and being communicated with said other air opening.

As have been described hereinabove, the arrangement of the air intake structure according to the present invention comprises the first air passage section disposed in the cowl frame structure and the second air passage section disposed outside the cowl frame structure, thus permitting a longer structure of the air passage as a whole and preventing penetration of rainfall into the vehicle chamber of the automobile. In particular, the disposition of the second air passage section outside the cowl frame structure provides the high freedom to form a number of traps in the second air passage section which are highly useful for prevention of rainfall from being penetrated into the vehicle chamber.

With this arrangement, it is necessary for the first air passage section to be disposed only at a transversely opposite corner portion of the cowl frame structure. It is to be noted that the transversely opposite corner portions of the cowl frame structure do not exert greatly adverse influences upon the space to be ensured for the mounting of the air conditioning unit U and the placement of the legs of the driver and passenger as well as for the engine room and the vehicle chamber space. Accordingly, the corner portions of the cowl frame structure can provide a sufficiently wide space that can accommodate a considerably broader cross-sectional area of the first air passage section, thus permitting the high freedom to introduction of outside air into the first air passage section. Furthermore, the provision of the second air passage section outside the cowl frame structure provides the high feedom to its disposition without undergoing restrictions from the disposition of the other mountings, thus ensuring a sufficient cross-sectional area of the second air passage section and a satisfactory space for the other mountings and for the engine and the vehicle chamber. Accordingly, the arrangement for the first and second air passage sections for the air intake structure according to the present invention permits their necessary cross-sectional areas to be ensured without interfering with the mountings, leg placement and so on, thus providing a sufficient amount of outside air into the vehicle chamber.

The above and other objects, features and advantages of the present invention will become apparent from the course of the description of preferred embodiments which will be hereinafter described in detail with reference to the accompanying drawings.

BRIEF DESCRIPTION OF THE DRAWINGS

FIGS. 1 to 7 relate to a first embodiment according to the present invention, in which:

FIG. 1 is a perspective view showing the fundamental portion of the air intake structure;

FIG. 2 is a perspective view showing an automobile in which the air intake structure is disposed;

FIG. 3 is a perspective view showing a portion of the forward vehicle body structure;

FIG. 4 is a cross-sectional view as taken along the line X4—X4 of FIG. 3;

FIG. 5 is a cross-sectional view as taken along the line X5—X5 of FIGS. 1 and 3;

FIG. 6 is a cross-sectional view as taken along the line X6—X6 of FIG. 3; and

FIG. 7 is a cross-sectional view as taken along the line X7—X7 of FIG. 1 and 3.

FIGS. 8 and 9 relate to a second embodiment according to the present invention, in which:

FIG. 8 is a perspective view showing the fundamental portion of the air intake structure; and FIG. 9 is a cross-sectional view as taken along the line X9—X9 of FIG. 8.

FIGS. 10 to 12 relate to an embodiment according to the present invention, in which:

FIG. 10 is a cross-sectional view as taken along the line X10—X10 of FIG. 11;

FIG. 11 is a perspective view showing the air intake structure taken with the bonnet and the fender panel removed; and FIG. 12 is a cross-sectional view as taken along the line X12—X12 of FIG. 11.

DETAILED DESCRIPTION OF THE PREFERRED EMBODIMENTS

Preferred embodiments of this invention will now be described by way of examples with reference to the accompanying drawings.

The first embodiment (FIGS. 1 to 7)

Figure 1:
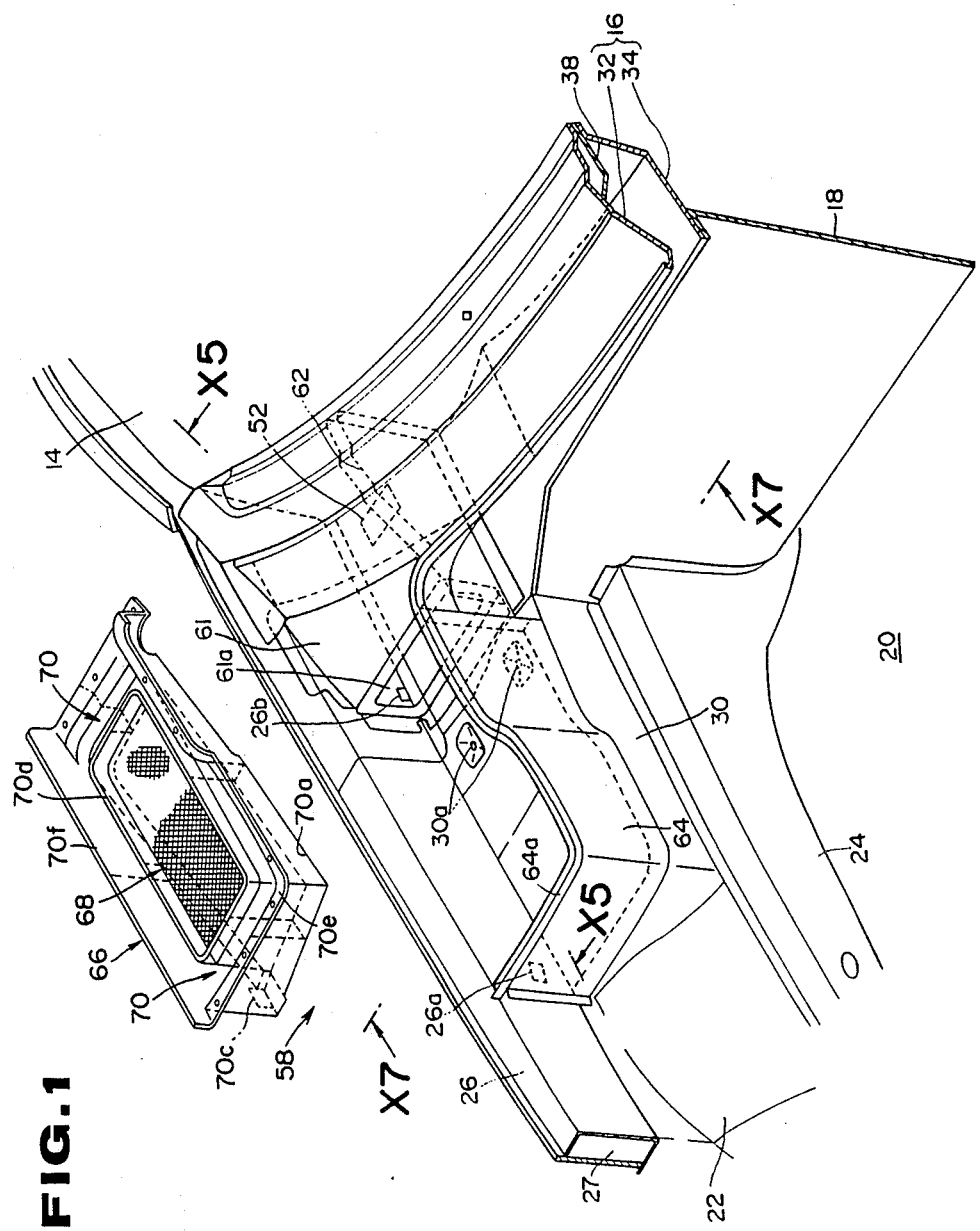

Referring to FIG. 2, 10 designates an automobile whose body is so designed that a front window 14 inclines relative to a bonnet 12 as a front hood with a large inclination angle. The bonnet 12 is hinged at its front portion to allow it to be opened from the rear side. A cowl frame 16 is arranged between the bonnet 12 and the front window 14, as shown in FIG. 1. Namely, a dash panel 18 constituting a front wall of the vehicle chamber is disposed at the front portion of the vehicle body of the automobile 10, and the cowl frame 16 as described later in detail is connected to the upper end portion of the dash panel 18, as shown in FIG. 3. In front of the dash panel 18, there is provided an engine room 20 whose side wall is comprised by a wheel apron 22. The wheel apron 22 is connected at its lower end portion to the front frame 24 and is also connected at its upper end portion to the wheel apron reinforcement 26 having a closed cross-section. The wheel apron 22 includes a tire housing 28 protruding into the engine room 20. On the tire housing 28 is disposed a suspension tower 30 extending upwardly in which a suspension unit is contained. The suspension unit may be a not shown double a wishbone type suspension. Since such double wishbone type suspension is employed in this embodiment, the height of the suspension tower 30 is set comparatively small and the clearance between the suspension tower 30 and the bonnet 12 is kept sufficiently when the bonnet 12 is closed.

Figure 4:
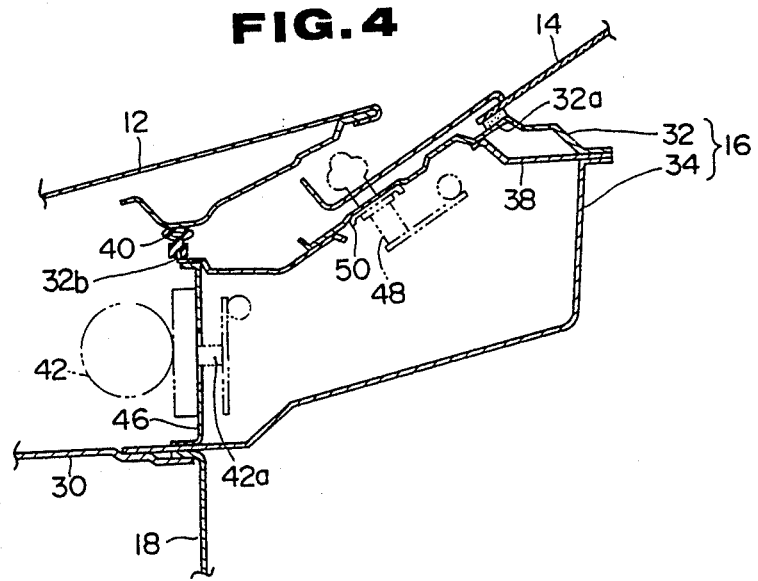
Figure 6:
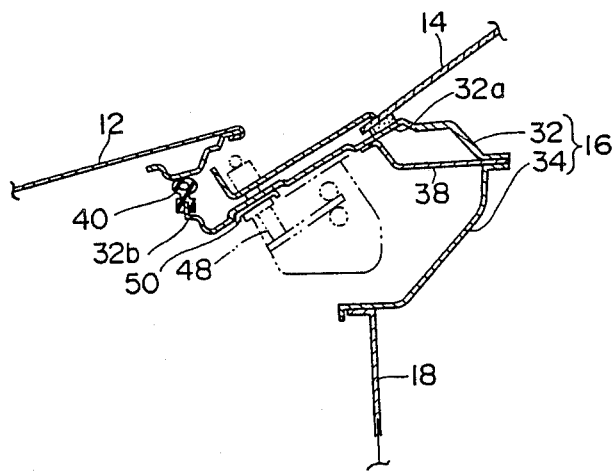
Figure 5:
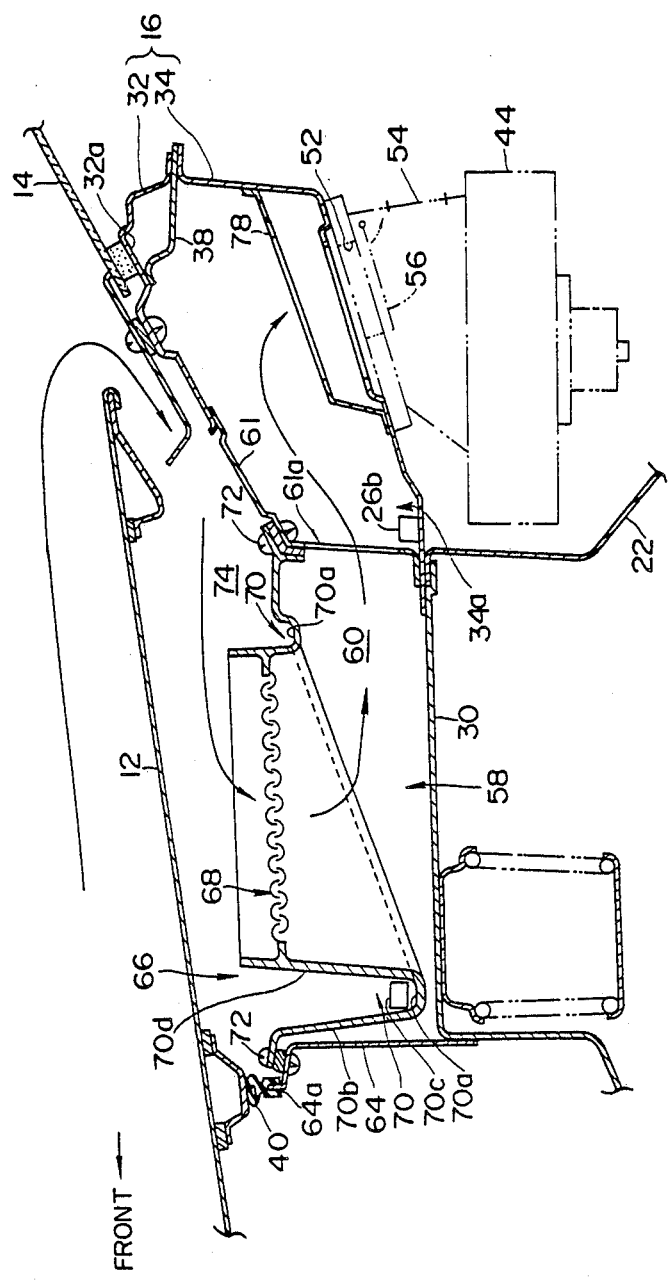

The cowl frame 16 may be of a so-called open cowl type one which comprises a cowl upper (upper cowl frame portion) 32 and a cowl lower (lower cowl frame portion) 34 whose rear ends being connected to each other, and which opens toward the front. The cowl upper 32 has a connection surface 32a for a front glass 36, which is formed at its rear end portion as shown in FIGS. 4 and 5 and is reinforced with a reinforcement 38 which forms a closed cross-section together with the cowl upper 32. The cowl upper 32 has a flange portion 32b, formed at its front end by bending its front end portion upwardly, to which is fitted a sealing member 40 for water sealing between the flange 32b and the bonnet 12 when the bonnet 12 is closed. The cowl lower 34 is connected at its front end portion to the upper end of the dash panel 18 which comparts the vehicle chamber room and the engine room 20.

The cowl frame 16 extends in the transverse direction of the vehicle body and its respective ends in the transverse direction are connected to wheel apron reinforcements 26, respectively. A wiper motor 42 can be attached to one end portion of the cowl frame 16 in the transverse direction (the end on the driver's sheet side, rightward on the drawing of FIG. 3) and a blower unit 44 for an air conditioning unit can be attached to the other end portion (the end on the passenger seat side, leftward on the drawing of FIG. 3). The cowl frame 16 has an auxiliary plate 46 at its one end portion in the transverse direction, which is connected to the front end of the cowl upper 32, the end portion of the cowl lower 34 and the wheel apron reinforcement 26, as shown in FIG. 4. The auxiliary plate 46 is used for the seat for the attachment of the wiper motor 42. Namely, the wiper motor 42 is attached to the auxiliary plate 46 with its drive shaft 42a turned to the rear. Two wiper pivot axes 48 cooperated with the wiper motor 42 are respectively attached to brackets 50 mounted at the one end portion and the center portion of the cowl upper 32 in the transverse direction (see FIG. 6).

At the other end portion of the cowl frame 16 in the transverse direction, the cowl lower 34 has a second air opening 52 formed therein. Below the cowl lower 34, a blower unit 44 is arranged to front the second air opening 52. The blower unit 44 substantially comprised by a blower is communicated with an outlet opening in the vehicle chamber through a not shown connection duct. By actuating the blower unit 44, the outside air flown in the second air opening 52 can be introduced into the vehicle chamber through the connection duct as described later. The blower unit 44 includes an opening 54, as shown in FIG. 5. The opening 54 and the second air opening 52 can be opened or closed selectively by a door 56. Where the automobile is provided with an air conditioning unit such as an air conditioner, the air fed from the blower unit 44 may be subjected to heating, dehumidication or cooling according to circumstances on the way, and then introduced into the vehicle chamber.

The air passage of the outside air introduced to the second air opening 52 is formed as follows. In front of the other end portion (at the provision side of the blower unit 44) of the cowl frame 16, an air intake box 58 is arranged on the suspension tower 30 to introduce the outside air, as shown in FIG. 5. The air intake box 58 and the other end portion of the cowl frame 16 constitute an air passage 60. More detailedly, the other end portion of the cowl frame 16 includes an extension panel 61 connected to the cowl upper 32. The extension panel 61 extends forwardly, then bends downwardly, and finally connects at its lower end to the cowl lower 34. In the extension panel 61 is formed a communicating opening 61a which opens forwardly. Also, the cowl panel 16 has a partition wall panel 62 extending from the cowl upper 32 to the cowl lower 34. The air intake box 58 is constructed utilizing the suspension tower 30 and the wheel apron reinforcement 26, together with an L-shaped panel 64 and an upper lid member 66. The L-shaped panel 64 extends forwardly from the partition wall panel 62, then bends outwardly, and finally connects to the suspension tower 30 and the wheel apron reinforcement 26. The L-shaped panel 64 constitutes the front wall and the inner side wall of the air intake box 58. The outer side wall of the air intake box 58 is formed by the wheel apron reinforcement 26, and the bottom wall of the same is formed by the suspension tower 30.

The upper lid member 66, made of synthetic resin, is formed in the configuration as shown in FIG. 1. A first air opening 68 which opens upwardly is formed at the center portion of the upper lid member 66. A drain groove 70 is arranged around the first air opening 68. The upper lid member 66 is attached to the upper flange portion 64a of the L-shaped panel 64 and the front end portion of the extension panel 61 extending forwardly from the cowl upper 32, by using screws 72 described later in detail. Consequently, the air passage 60 connecting the first air opening 68 and the second air opening 52 is formed as a passage extending forwardly from the cowl frame 16 by the other end portion of the cowl frame 16 and the air intake box 58 positioned in front of the other end portion, as shown in FIG. 5.

The first air opening 68 of the air intake box 58 is positioned beneath the bonnet 12 with a clearance. The outside air is introduced to the first air opening 68 from the rear end of the bonnet 12. The L-shaped panel 64 constituting the air intake box 58 is connected at its upper flange portion 64a to the flange portion 32b of the cowl upper 32. To these flange portions 64a and 32b is fitted the sealing member 40 which extends continuously (see FIGS. 4 to 7), whereby the region over the air intake box 58 is isolated from the engine room 20 when the bonnet 12 is closed. With such configuration, the outside air is introduced from the rear end of the bonnet 12 to the first air opening 68 through the upper region of the cowl upper 32. The air flowing into the first air opening 68 turns its flowing direction reversely, then flows toward the rear with the guidance by the air passage and finally blow off into the vehicle chamber from the second air opening 52. Namely, the outside air to be introduced into the vehicle chamber is passed through the two, upper and lower air passage sections formed by the cowl frame 16 and the air intake box 58, namely, an outside air introducing passage 74 for introducing the outside air from the rear end of the bonnet 12 to the first air opening 68, and the air passage 60, positioned below the outside air introducing passage 74, for introducing guiding the air fed from the first air opening 68 to the second air opening 52. On the way of the introducing passage of the outside air into the vehicle chamber, the outside air flows forwardly from the rear end of the bonnet 12 with the guidance of the introducing passage 74, turns its flowing direction oppositely, and then flows forward the rear of the vehicle in the air passage 60.

With the above structure, the outside air is introduced together with rainwater into the introducing passage 74 from the rear end of the bonnet 12. The drainage structure for thus introduced rainwater is constructed as follows. In the introducing passage 74, the cowl upper 16 and the extension panel 61 which constituting the bottom wall of the introducing passage 74 are arranged so that they are inclined downwardly in the forward direction. By this structure, rainwater flows down along the cowl upper 16 and the extension panel 61 into the drain groove 70 of the air intake box 58. The drain groove 70 is formed so that the forward portion thereof becomes deeper than the rearward portion, namely the forward portion of the bottom wall portion 70a of the drain groove 70 relative to the air intake box 58 becomes lower the rearward portion (see FIG. 5). The outer wall 70b of the drain groove 70 cofronting to the apron reinforcement 26 has a discharge hole 70c formed at its lower end portion. The discharge hole 70c confronts to an opening 26a formed by cutting out part of the wheel apron reinforcement 26, as shown in FIG. 7. Thus, rainwater flowing along the drain groove 70 is discharged to the outside through the discharge hole 70c, the opening 26a and the wheel apron reinforcement 26. The interior space of the wheel apron reinforcement 26 having the cross-section constitutes a drain passage for the rainwater. Moreover, the inner wall 70d of the drain groove 70 constituting the first air opening 68 projects upwardly well enough to prevent the rainwater from entering into the first air opening 68 even if a large amount of rainwater flowing along the drain groove 70 is splashed due to the vibrations during the driving.

In the air passage 60, the cowl lower 34 constituting the bottom wall of this air passage 60 is so designed that it inclines upwardly in the rearward direction. The second air opening 52 opens at the rear end portion of the cowl lower 34. In other words, the front end portion of the cowl lower 34 constitutes a drain groove 34a and rainwater flown into the drain groove 34a can be discharged to the outside from the discharge hole 26b of the reinforcement 26 through an interior space 76 of the reinforcement 26. Moreover, a baffle plate 78 protrudes around the second air opening 52, to prevent rainwater flowing along the drain groove 34a from entering into the second air opening 52 even if the rainwater splashes due to the vibration during the driving.

A discharge hole 30a communicating with the outside is formed in the suspension tower 30 constituting the bottom wall of the upstream portion of the air passage 60. Rainwater can be also discharged from this discharge hole 30a.

The upper lid member 66 of the air intake box 58 may be attached as follows. At the upper end portion of the outer wall 70b of the upper lid member 66 is formed a flange portion 70e which bends outwardly.

A flange portion 70e bending outwardly and having screw holes formed therein is formed at the upper end portion of thye outer peripheral wall 70b of the upper lid member 66 except the upper end portion facing to the wheel apron reinforcement 26. The upper end portion 70f of the outer peripheral wall 70b facing to the wheel apron reinforcement 20 extends perpendicularly beyond the level of the flange portion 70e, as shown in FIG. 7.

A front fender attached to the wheel apron reinforcement 26 by utiliging a bolt and a nut 80 has an inner end portion bending upwardly, and a drain groove 82a formed at the outer side, as shown in FIG. 7. An engaging portion 82b is also formed at the innermost end bending downwardly of the front fender 82.

In the attachment of the upper lid member 66, the upper end portion 70f of the outer peripheral wall 70b is engaged with the engaging portion 82b, and then the outer upper end portion of the outer peripheral wall 70b of the upper lid member 66 is fixed by screw to the front end portion of the extention panel 61 through a sealing member 84. In FIG. 7, 86 indicates a sealing member disposed between the wheel apron reinforcement 26 and the upper lid member 66. Sush attachment structure can reduce the mumber of the screws as well as the steps of the attachment operations of the upper lid member 66.

Figure 13:
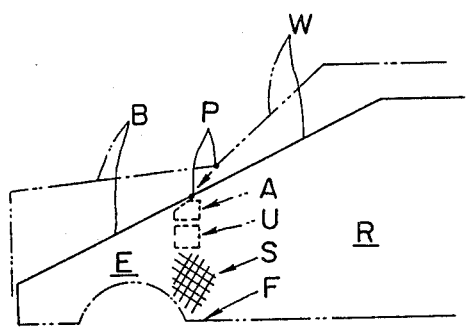
FIG. 13 is a diagrammatical view for explanation on problems with conventional air intake structure.

In the above arrangement, since the air passage 60 extends forwardly from the cowl frame 16, the restriction on the crosssectional area of the cowl frame 16 can be greatly relaxed, as compared with the conventional air intake structure in which such air passage is formed within the cowl frame 16. Accordingly, even if the vehicle body design having a lower cowl point P (see FIG. 13) is adopted, there is no problem to ensure a necessary space for mounting the air conditioning unit and placing the legs of the driver or passenger, for ensuring the cross-sectional area of the air passage. Also, it is no longer required to protrude the cowl frame into the vehicle chamber or into the engine room for ensuring a necesary space for mounting the air conditioning unit and placing the legs of the driver or passenger. Also, since the first air opening 68 is substantially covered with the bonnet 12, it is possible to settle such a problem existed in the prior art that the misoperation of the air conditioner such as a fan is occured due to the fact that the air conditionaer is frozen by a large amount of the penetrated outside air from the upper lid or the air opening by the direct exertion of the kinetic pressure during the driving, when actuating the blower unit 44 during the driving in the cold district, for example.

Also, since the flowing direction of the introduced outside airis turned reversely on the way of the air passage to introduced the side air into the vehicle chamber in the above embodiment, the frequency of the contact can be increased between the introduced outside air and the wall surface of the air passage. Accondary, it isi also increased the possibility for adhering the rainwater introduced together with the outside air to the passage all, so that the separation of the outside air from the rainwater and the discharge of the rainwater can be effected quickly. Also, the provision of the drain groove 70 around the perpherary of the first air opening 68 atwhich the flowing direction of the outside air is turned reversely further promotes the quick discharge of the rainwatter.

In addition, since the air passage 60 is constituted by the air intake box 58 disposed on the suspension tower 30 and the air intake box 58 is connected the cowl frame16, it is also advantageous the suspension tower 30 is reinforced by the air intake box 58.

Figure 9:
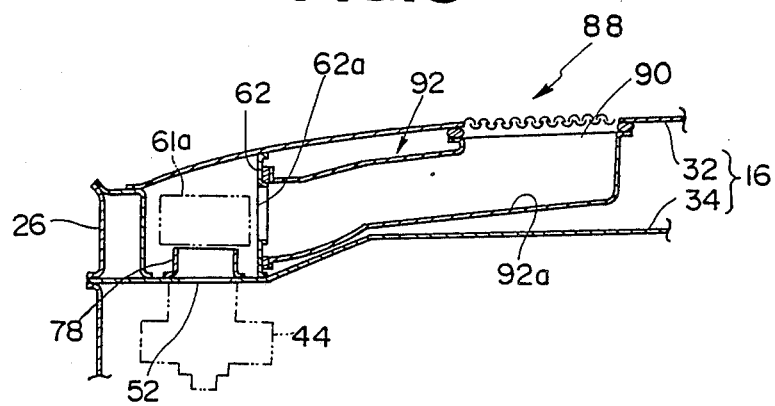

The second embodiment (FIGS. 8 and 9)

In the explanation on this embodiment, the reference numerals designating corresponding parts are the same as those in the first embodiment and the explanation for these parts in omitted. Hereinafter, it will be described the characterizing parts of this embodiment.

In this embodiment, an auxiliary air intake structure 88, is formed in the cowl frame 16. Namely, an auxiliary air opening 90 is formed in the cowl upper 32 and a communication opening 62a is formed in partition wall panel 62. The auxiliary air opening 90 and the communication opening 62 are communicated with each other through a duct 92 arranged within the cowl frame 16. As a measure for discharging rainfall penetrated from the auxiliary air opening 90, the bottom wall 92a of the duct 92 is formed as an inclined wall which is gradually lowered toward the partition wall panel 62, and one end of a discharge pipe 94 opens at the downstream portion of the bottom wall 92a (nearby the partition wall panel 62). The other end of the discharge pipe 94 penetrates thorough the L-shaped panel 64 and opens within the air intake box 58. Consequently, rainfall penetrated into the duct 92 is introduced through the discharge tube 94 into the air intake box 58, and then discharged to the outside from the discharge hole 32.

The communication opening 62a of the partition wall panel 62 is formed above the cowl lower 34 with a spacing, and the bottom wall 92a of the duct 92 is connected to the partition wall pannel 62 at the portion below and far away from the lower opening end of the communication opening 62. Namely, the partition wall panel 62 form a kind of dam at the portion below the communication opening 62a.

With such arrangement of the second embodiment, since outside air can be also introduced from the auxiliary air opening 90, the intake amount of introduced air can be supplemented when it is not enough with the air intake structure of the first embodiment.

Figure 10:
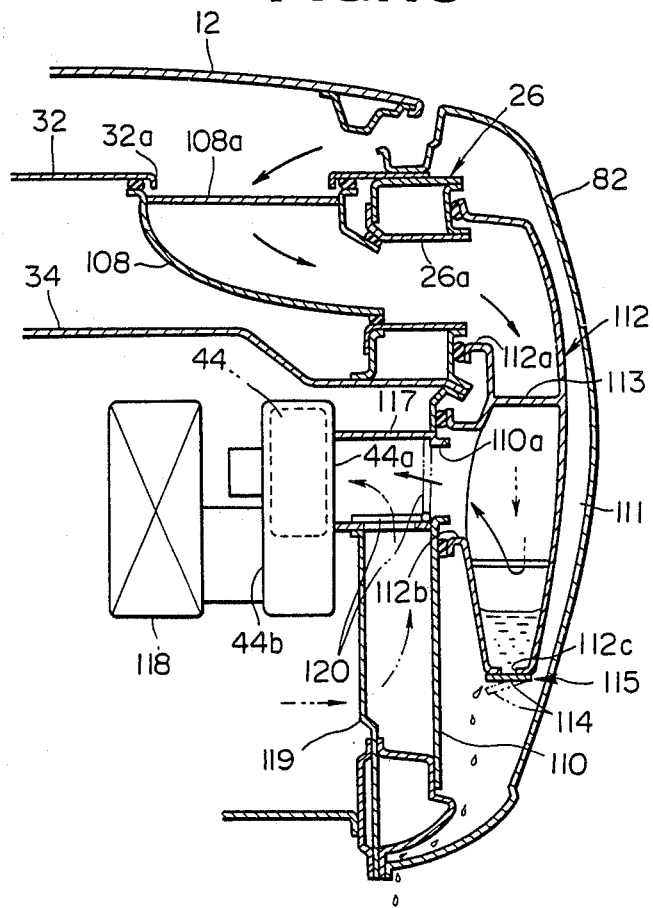
Figure 11:
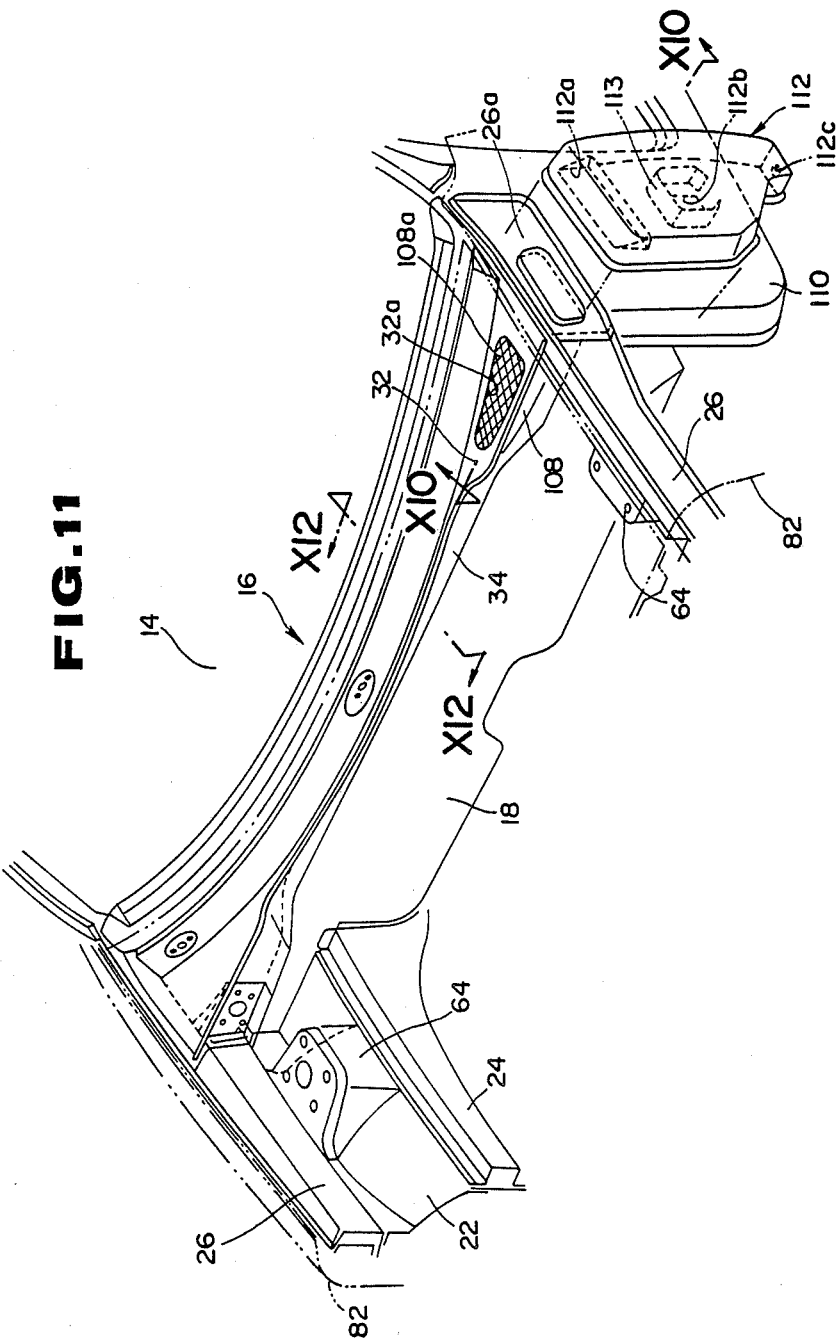
Figure 12:
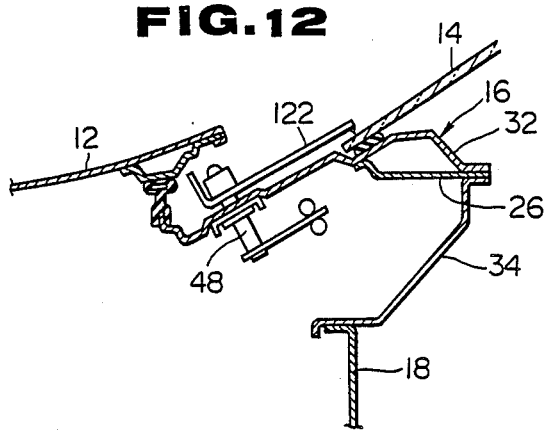

The third embodiment (FIGS. 10 to 12)

FIGS. 10 to 12 shows the third embodiment of this invention, in which the reference numerals designating corresponding parts are the same as these in the embodiment mentioned above and the explanation for these parts is omitted to avoid the duplication. In these drawings, 82 indicates a fender pannel arranged at the outer end position on the left side of the vehicle body. The upper end of the fender panel 82 is fixed through the end portion (left side and portion) of the cowl upper 32 to the wheel apron reinforcement 26 extending in the longitudinal direction of the vehicle body. At the left side and portion of the cowl upper 32 is formed a first air opening 32a which opens upwardly and which is communicated with an opening 26a formed in the upper portion of the wheel apron renforcement 26 through a duct 108. The duct 108 constitues a first air passage section, at the upper end which is provided a net 108a for preventing the penetration of dusts such as a withered leaf and a small stone. Consequently, outside air from the first air opening 32a of the cowl upper 32 is introduced into the duct 108 after the dusts have been removed.

The lower end of the wheel apron reinforcement 26 is fixed to the upper end of a cowl side panel 110 through the cowl lower 34 which supports a not shown instrument panel. The cowl side panel 110 has an opening 110a formed in the upper portion thereof.

A space portion 111 having an enough space is formed among the wheel apron reinforcement 26, the cowl side panel 110 and the fender panel 82. In the space portion 111, an air passage 112 is arranged in the form of unit box. The air passage 112, which constitutes the second passage section, has a first hole portion 112a and a second hole portion 112b formed in the upper portion and the substantially center portion of the inner side thereof (leftward on the drawing of FIG. 10), respectively. The first hole portion 112a and the second hole portion 112b are fixed by adhesion to the through hole 26a of the wheel apron reinforcement 26 and the opening 110a of the cowl side panel 110, respectively. A baffle plate 113 having substantially U shaped cross-section which opens downwardly is disposed at the inner peripheral edge portion of the second hole portion 112b of the air passage 112.

A third hole portion 112c is formed at the lower end of the air passage 112. To the third hole portion 112c is disposed on one-way valve 115 comprising thin rubber piece 114 which can cover the third hole portion 112c from outside. The one-way valve 115 opens or shuts the third hole portion 112c due to its biasing force. Consequently, upon rainfall, rainwater introduced together with outside air from the first hole portion 112a of the air passage 112 through the net 108a of the duct 108 into the air passage 112 is blown to the upper face of the baffle plate 113 of the air passage 112. Then the rainwater passes through the side portion of the baffle plate 113 and it is collected at the lower end portion of the air passage 112. Thereafter, the collected rainwater pushes down the rubber piece 114 by its own weight to open the one-way valve 115. As a result, the rainwater is discharged to outside from the third hole portion 112c. On the other hand, the outside air is introduced into the second hole portion 112b after having gone round the lower portion of the baffle plate 113 from the side portion of the same.

The blower unit 44 comprising a sirocco fan is disposed below the cowl lower 34. A suction hole portion 44a of the blower unit is faced to the second hole portion 112b, and both hole portions 44a, 112b are communicated with each other through a passage 117. An outlet 44b of the blower unit 44 is communicated with an air conditioner 118 arranged at the left front portion within the vehicle chamber which is on the assistant driver's sheet side. A communication passage 119 whose one end opens toward the vehicle chamber opens at and communicates with the intermediate of the passage 117. At the upper stream than the opening portion of the communication 119 of the passage 117, an on-off valve 120 is disposed to effect the on-off control for the second opening portion 112b of the air passage 112. The on-off valve 120 is actuated by the change-over operation of a swich attached to a not shown instrument panel, so that outside air is introduced into the vehicle chamber when the valve 120 is O (the second hole portion 112b opens), and outside air is intercepted and the air within the vehicle chamber circulates when the valve 120 is OFF.

In FIG. 10, 12 indicates a bonnet as a front hood, and in FIG. 12, 122 indicates a wiper.

In the operation of the third embodiment, the outside air introduced from the first air opening 32a is introduced into the air passage 112 arranged within the air portion 111 having enough space between the cowl side panel 110 and the fender panel 82, through the duct 108 from the first hole portion 112a of the air passage 112. And the only introduced air is gone round the below of the baffle 113, is then sucked in the blower unit 44 through the passage 117 from the second hole portion 112b, to be fed to the air conditioner 118.

Although the embodiments of this invention have been described, the structure of the cowl frame 16 may be a so-called cowl box type one in which a closed cross-section is formed by the cowl upper 32 and the cowl lower 34. Also, the air passage 60 for introducing the outside air to the second air opening 52 may be formed by a duct which extends from the inside of the cowl frame 16 to the forward.

While the invention has been particularly shown and descrived with reference to preferred embodiments thereof, it will be understood by those skilled in the art that the foregoing and other changes in form and details can be made therein without departing from the spirit and scope of the invention.

What is claimed is:

1. An air intake structure of an automobile comprising:

a dash panel constituting a forward wall member of a vehicle chamber, said dash panel being disposed underneath a front glass window;

a cowl frame member extending in a transverse direction of a vehicle body, said cowl frame member comprising an upper member portion supporting a bottom portion of said front glass window and a lower member portion connecting said upper member portion to an upper portion of said dash panel;

an air passage communicating a first air opening with a second air opening, said first air opening capable of introducing open air into the air passage and said second air opening capable of introducing the air introduced from said air passage into the vehicle chamber;

one of said first and second air openings having an opening facing the inside of said cowl frame member at a transversely opposite end portion of the vehicle body, the other air opening positioned at the outside of said cowl frame member; and said air passage comprising a first air passage section and a second air passage section, said first passage section being formed in the space within said cowl frame member at the transversely opposite end portion thereof and being communicated with said one air opening, and said second air passage section formed outside said cowl frame member and being communicated with said other air opening.

2. An air intake structure as claimed in claim 1, wherein said second air passage section is disposed in front of said cowl frame member.

3. An air intake structure as claimed in claim 2, wherein said other air opening is disposed in front of said cowl frame member and said one opening is formed at the lower member portion of said cowl frame member.

4. An air intake structure as claimed in claim 3, wherein a partition wall panel is disposed to connect said upper member portion of said cowl frame member to said lower member portion thereof at the transversely opposite end portion of the vehicle body and to divide a space within said cowl frame member in a transverse direction of the vehicle body; and a space in the cowl frame member outside said partition wall panel in a transverse direction thereof constitutes said first air passage section.

5. An air intake structure as claimed in claim 4, wherein a wheel apron having a suspension tower and a wheel apron reinforcement member reinforcing an upper portion of the wheel apron each is disposed in a direction extending forwardly from a transverse end of said dash panel;

said suspension tower and said wheel apron reinforcement member are connected to said cowl frame member via a partition panel in a substantially L-shaped form extending forwardly from the vicinity of said partition wall panel and being curved outwardly in a transverse direction of the vehicle body; and a space partitioned by said partition panel constitutes said second air passage section.

6. An air intake structure as claimed in claim 5, wherein said upper member portion is provided with a supplementary air opening for introducing open air supplementarily, said supplementary air opening being disposed at a side toward the center of the vehicle body from said partition wall panel; and said partition wall panel is provided with an opening being communicated with said supplementary air opening through a duct disposed in a space within said cowl frame member.

7. An air intake structure as claimed in claim 1, wherein a partition wall panel is disposed to connect said upper member portion of said cowl frame member to said lower member portion thereof at the transversely opposite end portion of the vehicle body and to divide a space within said cowl frame member in a transverse direction of the vehicle body; and a space in the cowl frame member outside said partition wall panel in a transverse direction thereof constitutes said first air passage section.

8. An air intake structure as claimed in claim 2, wherein a front hood member is disposed so as to cover upper portion of a space forward of said dash panel and said second air passage section; and said other air opening is positioned in front of a rearward end of said front hood member.

9. An air intake structure as claimed in claim 8, wherein an upper air passage is formed leading open air forwardly from a gap between said rearward end of said front hood member and said cowl frame member; and a forward side portion of said upper air passage is communicated with said other air opening positioned at a forward side portion of said second air passage section.

10. An air intake structure as claimed in claim 2, wherein a wheel apron having a suspension tower and a wheel apron reinforcement member reinforcening an upper portion of the wheel apron each is disposed in a direction extending forwardly from a transverse end of said dash panel;

said suspension tower and said wheel apron reinforcement member are connected to said cowl frame member via a partition panel in a substantially L-shaped form extending forwardly from the vicinity of said partition wall panel and being curved outwardly in a transverse direction of the vehicle body; and a space partitioned by said partition panel constitutes said second air passage section.

11. An air intake structure as claimed in claim 4, wherein a space formed forward of said dash panel is covered with said front hood member, a gap being formed between a rearward end of said front hood member and said cowl frame member; and said other air opening is located underneath said front hood member.

12. An air intake structure as claimed in claim 5, wherein a space within said partition panel having an upward opening is covered with a covering member; and said covering member is provided with said other air opening and with a drain groove around said other air opening.

13. An air intake structure as claimed in claim 1, wherein a space formed forward of said dash panel is covered with said front hood member, a gap being formed between a rearward end of said front hood member and said cowl frame member; and said other air opening is located underneath said front hood member.

14. An air intake structure as claimed in claim 1, wherein said one opening is formed on the upper member portion of said cowl frame member.

15. An air intake structure as claimed in claim 14, wherein a side end portion of said cowl frame member is connected to a cowl side panel, a front fender member being disposed outside said cowl side panel in a transverse direction of the vehicle body; and said second air passage section is formed between said cowl side panel and said front fender member.

16. An air intake structure as claimed in claim 15, wherein said other air opening is formed on said cowl side panel and having an opening facing a gap formed between said cowl side panel and said front fender member.

17. An air intake structure as claimed in claim 16, wherein said second air passage section is provided with a baffle member for avoiding penetration of rainfall at a position immediately above said other air opening.

18. An air intake structure as claimed in claim 14, wherein a space formed forward of said dash panel is covered with said front hood member, a gap being formed between a rearward end of said front hood member and said cowl frame member; and said other air opening is located underneath said front hood member.

* * * * *